ALLEN M. STELLE,
PAUL K. BEEMER,
HENRY O. FUCHS,
INVENTORS.

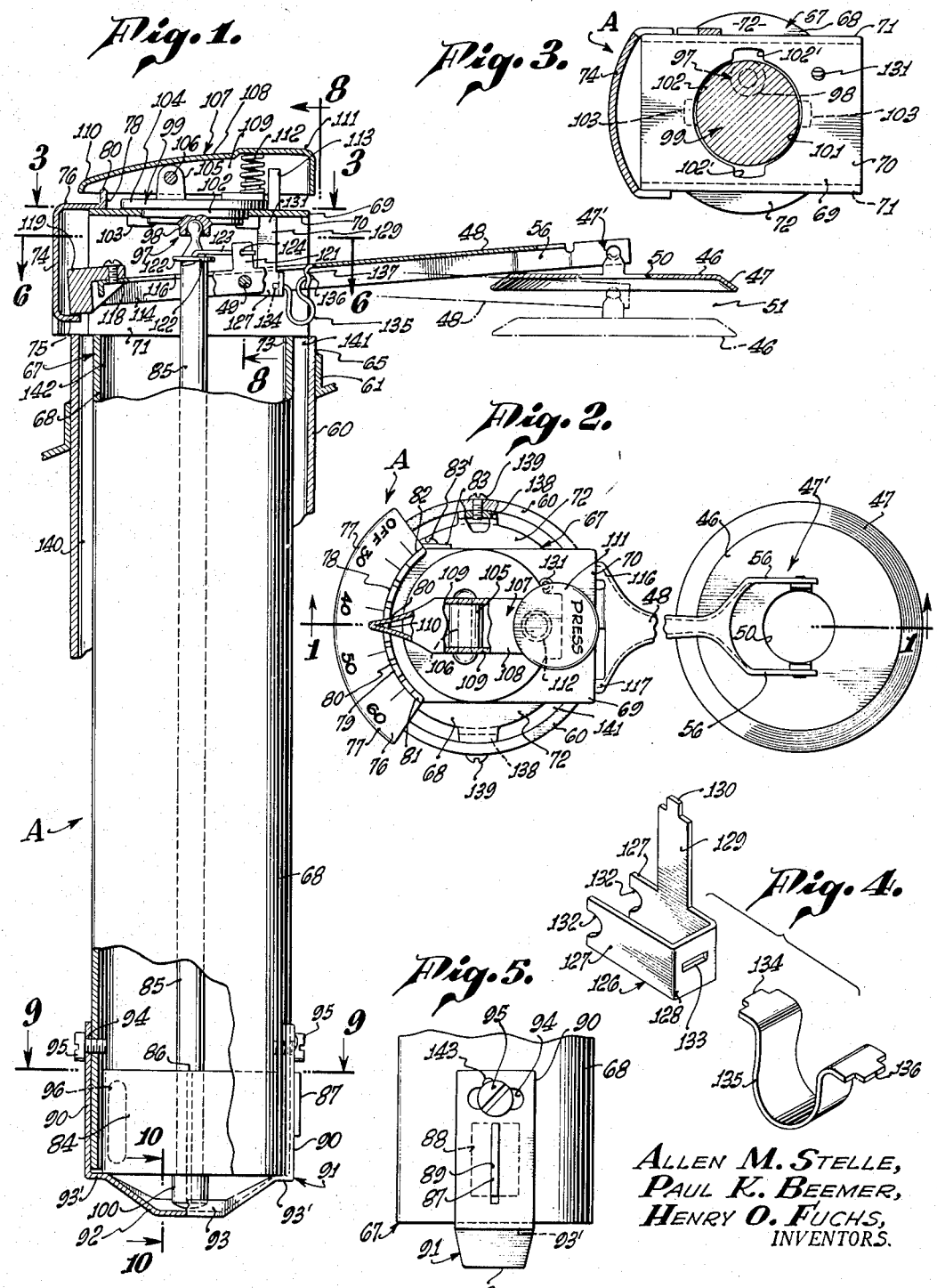

BY

Barkelew & Scantlebury

ATTORNEYS.

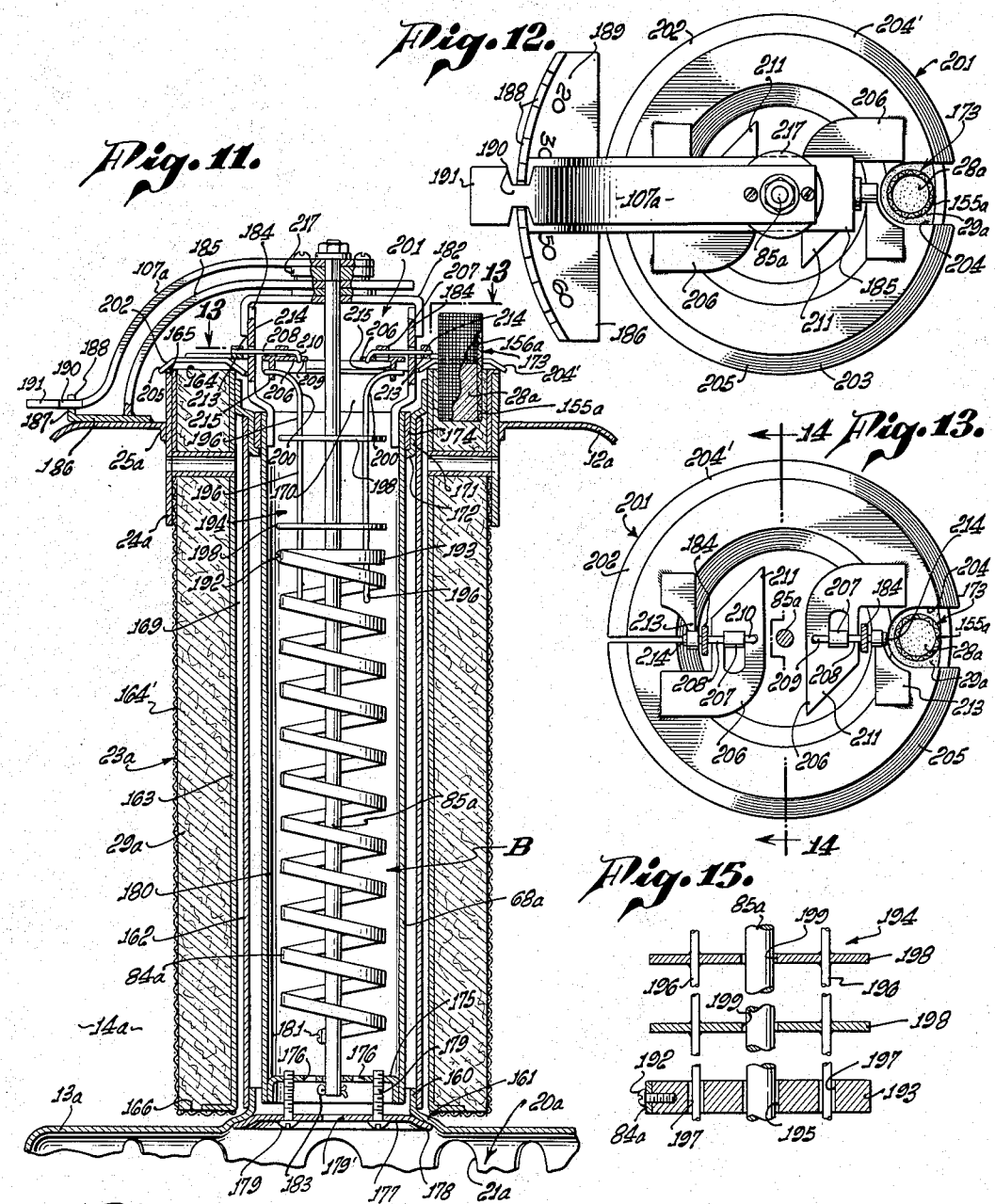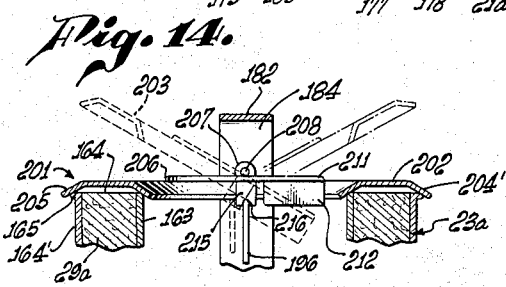

United States Patent Office 2,742,318
Patented Apr. 17, 1956

2,742,318

THERMOSTATIC CONTROL UNIT

Allen M. Stelle, San Marino, Paul K. Beemer, Pasadena, and Henry O. Fuchs, Los Angeles, Calif., assignors to Preco Incorporated, Los Angeles, Calif., a corporation of California Original application November 7, 1949, Serial No. 125,944, now Patent No. 2,717,590, dated September 13, 1955. Divided and this application March 16, 1951, Serial No. 215,972

12 Claims. (Cl. 297—16)

The present invention has to do generally with thermostatic control units, and is more particularly concerned with units especially well adapted to control the burners of heating devices.

This application is a division of our co-pending application entitled Thermostatically Controlled Heater, filed November 7, 1949, Serial No. 125,944, now Patent No. 2,717,590.

The invention is appliable with particular advantage to wick-type burners of heaters used to control the temperature of produce-laden railroad cars and trucks. We will therefore discuss and describe it in that environment, but it will be understood this is in no way to be considered as limitative on the invention.

Heaters used in produce-car and truck heating, are frequently exposed to extremely severe service conditions, and yet, to be satisfactorily effective, they must promptly be responsive to temperature changes—in other words they must be rugged and sturdy and yet the thermostatic control must have a degree of sensitivity which usually demands mechanism of a delicateness rendering it unable to withstand harsh service conditions.

It is necessary that the thermostatic control be as nearly unfailing in performance as possible, for great economic loss may result from temperature conditions (high or low) which have deteriorative effect on produce. A special need for insuring unfailing performance during long periods of hard use, arises from the fact that produce cars are inaccessible to attendants during much of their time in transit. Therefore there is great opportunity for cargo-damage which could be avoided were the thermostatic controls to be under constant observation and accessible for immediate repair or replacement upon discovery of a failure or of a weakness which might be expected to result in failure.

It is therefore among the major objects of our invention to provide a thermostatic control which is sufficiently rugged and strong to withstand extremely severe service conditions, yet one which is relatively sensitive to surrounding temperature conditions, relatively quick-acting in its controlling response to changes in temperature, and is, within all reasonable limits, unfailing in performance.

It is also an object of the invention to provide a thermostatic control unit of such simplified construction that its fabrication and assembly costs are held to a minimum.

Other objects and features of the invention will be made apparent in the following detailed description, reference being had to the accompanying drawings, in which:

Fig. 1 is a medial section, partly in broken-away elevation, through the thermostatic control unit, the section being taken on line 1—1 of Fig. 2; the view also showing fragments of supporting structure (not a part of the present invention) for the unit;

Fig. 2 is a top plan view of Fig. 1, partly broken away in section;

Fig. 3 is a section on line 3—3 of Fig 1;

Fig. 4 is an exploded view of a portion of a snap-over spring assembly which may be incorporated in the device;

Fig. 5 is a fragmentary elevation of the lower end of Fig. 1, as viewed from the right thereof;

Fig. 11 is a longitudinal medial section through a variational form of thermostatic control unit, showing also environmental structure which supports the unit;

Fig. 12 is a top plan view of Fig. 11, except that the supporting structure is omitted;

Fig. 13 is a section on line 13—13 of Fig. 11;

Fig. 14 is a fragmentary section on line 14—14 of Fig. 13; and

Fig. 15 is a detached and longitudinally contracted view of a portion of the torque transmitting unit of the device.

Figure 6:
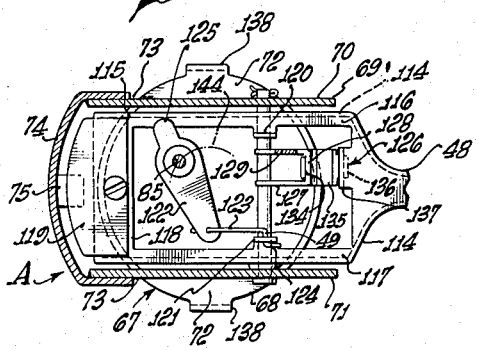
Fig. 6 is a section on line 6—6 of Fig. 1, except that it shows the control crank arm and its operating rod moved to positions other than those they occupy in Fig. 1.

As stated in the introduction, the thermostatic control unit A is particularly well adapted for use in connection with the control of wick-burners of heating devices, though not limited to such use. Accordingly, for purposes of illustration, only, we have shown a wick-flame snuffer as being connected to and movable by the thermostatic control element, the snuffer being of a type to regulate or snuff the flame from an annular wick burner such as is shown in the aforementioned co-pending application.

Thus, a flame regulating member is here shown in the form of an annulus 46 having a down-turned peripheral flange 47 (Figs. 1 and 2), but, as noted above, this portion of the showing is not to be taken as indicating that the control element of the thermostatic control unit has to be connected to any particular regulating member, nor that the claims are limited to such connection. The flame regulators and snuffers here illustrated, are claimed in our co-pending application entitled Flame Snuffer for Wick-Burners, filed March 16, 1951, Serial No. 215,971.

Annulus 46 is pivotally mounted at 47′ on the fork-arms 56 of the control element of unit A, said element being in the form of a main arm 48 of inverted channel cross-section. Arm 48, in turn, has pivotal mounting on shaft 49 which supports the annulus so its bore 50 is substantially coaxial with the cylindrical burner-wick (not shown) which underlies it. When annulus 46 is in the dotted line position of Fig. 1 it covers the outer annular or main-burner portion of said wick and thus maintains that portion of the burner extinguished, though the bore of the annulus allows the central portion of the burner to remain lighted and thus serve as a pilot burner. Movement of arm 48 which varies the spacing between the wick and annulus, serves to regulate the height of the main burner flame. We will more definitely locate and describe the support of shaft 49, at a later point in the description.

The supporting means for unit A comprises no part of the present invention, but, to clarify certain points made later in the specification, certain elements thereof are shown and will be briefly described. Thus, a vertical sleeve 60 is illustrated as extending through a heater-dome neck, fragmentarily illustrated at 61. The upper end 65 of the sleeve serves to support unit A in annularly spaced relation thereto, as at 140.

Unit A includes a housing generally indicated at 67; made up of cylindrical jacket 68 (Figs. 1 and 3) and the generally rectangular shell 69 which is in the form of an inverted channel member having a top wall or web 70 and vertical side walls or flanges 71. Side walls 71 have segmental horizontal flanges 72 welded at 73 to jacket 68, and it is these walls which support pivot-shaft 49, previously spoken of, whereby arm 48 is mounted for swinging movement. Walls 71 extend chordally beyond jacket 60 (Fig. 7) and are connected at one side of the jacket by the end wall 74 which is arcuate as viewed in plan, the lower edge of wall 74 having a struck-up ear 75 to act as an arm stop. Horizontal scale-plate 76 is integral with wall 74 and carries scale marks or calibrations 77 (Fig. 2). The marks indicate temperatures at which the thermostat, to be described, may be selectively regulated to actuate snuffer 46. Scale-plate 76 has a vertically extending latching flange 78 provided with alternate notches and projections 79 and 80, respectively, corresponding with certain of the marks 77, this flange being arcuate, as viewed in plan, and being concentric with respect to jacket 68. At one end of the flange 76 is a stop lug 81, projecting higher than do projections 80 (Fig. 8) while at the other end of the flange is an "off" projection 82 of the same height as, but of greater arcuate extent than, projections 80. At the outer end of and extending above projection 82, is arranged a stop member 83 secured to a side wall 71 and 83'.

Figure 9:
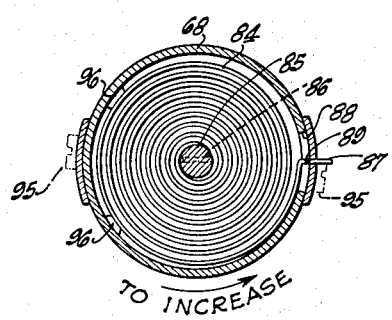
Fig. 9 is a section on line 9—9 of Fig. 1.
Figure 10:
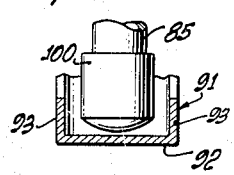
Fig. 10 is a detail section on line 10—10 of Fig. 1.

The lowermost end of tube 68 houses the bi-metallic, coiled-band type of thermostatic element 84 (Figs. 1 and 9) having the resilient qualities usual to such elements. The inner end of the coil is operatively connected to actuating rod 85 by extending it through rod-slot 86 which opens to the bottom of the rod. The outer end of the coil is reduced slightly in width to form a tab 87 which is turned angularly through the relatively wide jacket-slot 88 and through the relatively closely fitting slot 89 in one of the legs 90 of calibration adjustment member or yoke 91. The legs 90 fit the jacket 68 at diametrically opposite sides thereof, while the stirrup portion 92 of the yoke is spaced below the end of jacket 18 and freely admits air from below to the bore of the jacket and, of course, to the spaces between the coils of element 84. The stirrup has horizontally spaced vertical flanges 93 (Figs. 1 and 10) and has horizontal shoulders 93' which limit the downward movement of the thermostat element 84. Legs 90 have horizontal slots 94 through which attachment screw 95, threaded into jacket 68, extend. After loosening screws 95, member 91 may be rotated (within the limits established by the circumferential extents of slots 88 and 94) to act on thermostat tab 87 and hence on the entire element 84 in a manner to rotate rod 85 and the elements carried thereby. This mechanism is used for setting the thermostat to the calibrations 77, as will appear.

The jacket 68 is preferably pressed in at the side opposite tab 87 to form elongated lugs 96 which hold element 84 against excessive bodily side shift such as might clear tab 87 from slot 89.

Thermostatic coil 84, through its association with the jacket 68 and stirrup 92, supports rod 85 from its lower end. The upper end of the rod has universal joint connection 97 (Fig. 1) with the socketed boss 98 carried by disk 99. Stirrup 92 opposes the head 100 which is secured to the lower end of rod 85 to pinch the slotted rod about the coil end 86 and thus retain the coil in position. Stirrup 92 prevents rod 85 from dropping a sufficient distance to disengage the ball and socket joint 97 in the event the stiffness of the coil is insufficient to hold the rod up. The stirrup and its flanges also limit the transverse movement of the lower end of the rod, but the limitation is not close, for head 100 has fairly free capacity for bodily transverse displacement.

Disk 99 is mounted for rotation with respect to housing portion 69 by reason of its particular mounting in top-wall 70. Said wall is provided with a bore 101 which is concentric with jacket 68, and from this bore there extend diametrically opposite notches 102' (Fig. 3). Disk 99 has a portion 102 adapted to have rotational bearing in bore 101, ears 103 extending radially from bearing portion 102 and lying just beneath housing-top 70. Above the plane of wall 70, the disk has a diametrically enlarged portion presenting an annular flange 104 spaced from ears 103 by the common thickness of wall 70 and disk portion 102. This disk is assembled with the housing by rotating it 90° from the position of Fig. 3, lowering it until portion 102 enters bore 101 and then rotating it to bring ears 103 out of register with notches 102', the ears and the flange 104 thereafter holding the disk from vertical displacement but allowing its rotation. The limit of rotation of the disk during operation of the device is such that the ears 103 cannot accidentally move back into register with notches 102'.

Figure 8:
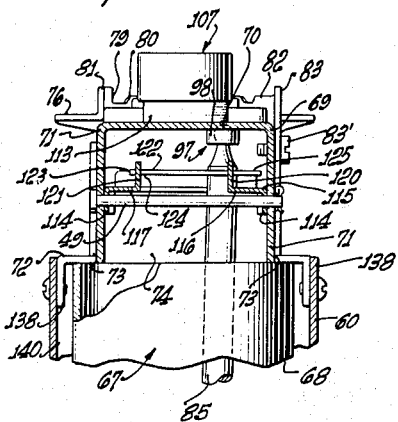
Fig. 8 is a section on line 8—8 of Fig. 1.

Depending boss 98 is integral with but eccentrically located on disk 99 (Figs. 1, 3 and 8). Integral with and upstanding from disk 99 is an eccentrically arranged lug 105 supporting a cross pin 106 which provides a pivot for regulating handle 107. The handle is formed as an inverted channel having top wall 108 and side walls 109, the pivot pin 106 extending through said side walls, the latter taking lug 105 nicely between them.

Handle 107 has at one end a pointer-portion 110 which is pinched down, as viewed in plan (Fig. 2) to be of a width to be taken nicely in regulation-setting notches 79 and yet to leave side walls 109 sufficiently spread to take regulation-setting projections 80. Thus, the handle may be held against rotation in a number of settings equal to the sum of the number of notches and projections. The top wall of the handle at its other end is provided with a thumb pressure pad 111 beneath which is mounted an expansion spring 112 adapted to bias the handle in a counterclockwise direction, thus tending constantly to engage the pointer 110 with the setting notches or projections. Lug 113, upstanding from disk 99 and having sliding fit between side walls 109, takes a part of the load in the transmission of torque from the handle to disk 99.

Since coil 84 yieldably tends to hold the lower end of rod 85 approximately centered with respect to jacket 68, and since the upper end of the rod is mounted in disk-socket 98 which, in all its positions of adjustment, is eccentric with relation to the jacket, it will be seen that rod 85 is always inclined with respect to the longitudinal axis of the jacket.

Figure 7:
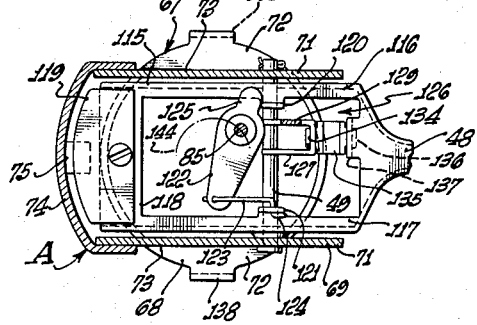
Fig. 7 is a view similar to Fig. 6 but showing the control mechanism in "off" position.

It will be obvious that by depressing the thumb pad end of the handle, pointed end 110 will be cleared from the setting formations 79 and 80, whereupon torque applied to the handle rotates disk 99 and, due to the eccentric location of hub 98, bodily translates the upper end of rod 85 from, for instance, the position of Fig. 6 toward that of Fig. 7. Release of pressure from pad 111 allows spring 112 to engage the pointer with the newly registering setting formation, thus latching the disk 99 and rod 85 in their new positions of adjustment.

The formation of that portion of arm 48 which lies within housing 69 will now be described. The arm is there widened, its edges being downwardly turned to provide flanges 114 which fit, with working clearance, between the housing walls 71. Pivot shaft 49 passes through those flanges. The widened portion 115 of the arm is centrally cut away to form arms 116 and 117 connected at their ends by cross bar 118, a counterweight 119 being screwed to the latter. Housing ear 75 is positioned beneath counterweight 119 to act as a stop limiting the counterclockwise movement of arm 48, as viewed in Fig. 1, and thus establishing the height to which snuffer 46 is elevated above the main burner when the latter is in full operation. Weight 119 substantially counterbalances the longer portion of arm 48 and the snuffer annulus 46, rendering the snuffer substantially non-responsive to vertical acceleration.

Ears 120 and 121 are struck upwardly from arms 116 and 117, respectively, the ears being substantially in vertical alinement with pivot 49 when arm 48 is exactly horizontal. Ear 120 serves as a stop for arm 48 under a "shut-off" setting of handle 107, as will later appear, while ear 121 functions as a crank arm in the operative connection between rod 85 and arm 48.

Secured to rod 85 at a point above arm 48, is crank arm 122 (Figs. 1 and 6 to 8) whose distal end is connected to crank arm 121 by link or connecting rod 123. The point of pivotal connection 124 between crank 121 and connecting rod 123 lies substantially in the vertical axial plane of pivot 49 when arm 48 is exactly horizontal. Crank 122 is extended at the opposite side of rod 85 to form a stop lug 125 which, in the shut-off position of adjustment of rod 85 engages lug 120 to positively hold arm 48 and snuffer 47 down.

In considering the showing of Fig. 6, it is to be remembered that, as stated in the brief description of the figure, rod 85 is shown as shifted to a position of regulation other than that it occupies in Fig. 1, for, with rod 85 in the position of Fig. 1, crank 122, as viewed in plan, is normal to the axis of arm 48.

Though not essential to the operation of the above described mechanism and therefore not to be considered as limitative on the invention, it is sometimes of advantage to provide means for snapping arm 48 to fully elevated or fully depressed positions as pivot point 124 passes through the vertical axial plane of pivot 49 during actuation of crank 122 by thermostatic rotation of rod 85 under circumstances to be described. We have devised a particularly efficient and simple snap-over mechanism for this purpose, as disclosed particularly in Figs. 1 and 4. A formation adapted to function as a snap-spring anchor, fixed with respect to housing 69, is illustrated in detached aspect in Fig. 4 and is generally indicated at 126. This anchor includes arms 127 connected by bridge 128 and from one of which arms there extends a member 129 having an attachment tab 130 extended through housing-top 70 as at 131 (Fig. 3). Arms 127 are notched at 132 to take pivot shaft 49, said shaft acting to support the anchor. Bridge 128 is pierced at 133 to receive the tab 134 of snap-over, loop-spring 135 which, in Fig. 4, is shown in unstressed condition. The tab 136 at the other end of the spring loop is adapted to be engaged with ear 137 (Fig. 1) punched down from the web portion of channeled arm 48.

Spring 135 is installed in stressed condition as shown in Fig. 1, functioning resiliently to hold arm 48 either in the full line or dotted line position of that figure. As will later appear, the reaction of coil 84 to changing temperature conditions build up forces which finally become of sufficient magnitude to overcome the opposing force of spring 135; and the arm 48 with its annulus 46 is snapped from full line position to dotted line position, or vice versa. Shaft 49 is stationary and does not swing with arm 48; so that the pressure of member 126 against it does not impede the arm action.

Unit A is contained in housing sleeve 60, the lower edges of walls 71, where they extend beyond jacket-tube 68, engaging the upper end of the sleeve. The segmental flanges 72 of housing 69 have down-turned, diametrically opposite lugs 138 which are radially spaced from tube 68 (Fig. 8) and fit nicely within the bore of sleeve 60, thus serving to annularly space jacket 68 and sleeve 60. Sleeve-carried screws 139 (Fig. 2) are threaded through lugs 138 to hold the unit A releasably within sleeve 60 and in fixed location with respect to the other units of the heater. For instance, the unit is thus positioned so snuffing annulus 46 is held substantially coaxial with the burner cartridge (not shown, but previously identified). The described coaxial setting of jacket 68 in sleeve 60 establishes between them a vertically extending annular space 140, the space opening to the atmosphere at its lower end and also at its upper end 141 (Fig. 1). The exterior of thermostat jacket 68 is thus exposed, throughout its length, to the temperature conditions of the air surrounding the heater, with obvious advantage. It is also to be noted that the upper end of the bore 142 of jacket 68 opens to the atmosphere through the housing shell 69, so that air can move through the jacket and past the thermostatic element 84.

It will now be assumed that snap-over spring 135 is omitted from the assembly. Before proceeding to a detailed discussion of the calibration and regulation of the thermostatic element, it is first to be noted that, with the upper end of rod 85 fixed against translation, a rising temperature applied to thermostatic coil 84 causes that coil to uncoil or tend to uncoil, thus rotating or tending to rotate, rod 85 and crank arm 122 in a counterclockwise direction (Fig. 6) thrusting on connecting rod 123 and crank arm 121 in a manner tending to swing arm 48 in a clockwise direction from the full line position of Fig. 1 to the dotted line position to lower the snuffer. On the other hand, a decreasing temperature applied to coil 84 acts reversely, that is, it tends to swing arm 48 in a counterclockwise direction to raise the snuffer.

It will have been predetermined that, with the thermostatic coil 84 in equilibrium, and the upper end of rod 85 held against translation, it requires a rise or fall of a given number of degrees or a fraction of a degree in temperature to rotate rod 85 about its axis sufficiently to swing arm 48 from either the full line or the dotted line position to a midway position. We will call this predetermined extent of rise or fall in temperature the "operating differential."

In order to explain the setting, regulation and operation of the thermostatic control, it will be assumed that unit A is detached from the heater, that snap spring 135 is detached from the assembly, and that certain steps are taken that, actually, are taken only during the initial preparation of a given unit for service, and certain other steps taken that, actually, may be taken only in establishing calibrations which are thereafter reproduced as standard for all thermostatic controls of like structure. It is, of course, to be remembered that the particular procedures described are given by way of example, only, and are not at all to be considered as limitative either on the practices which may actually be put into effect nor on the invention.

It will be assumed that regulator handle 107 is set at a point representing 32° F. on calibrations 77, it resulting that arm 85 and crank arm 122 are approximately in the positions of Fig. 7 except that they will be further to the left so that definite clearance exists between stop 120 and lug 125. It will also be assumed that screws 95 are loosened.

The thermostat coil 84 is then exposed to a temperature of 32° F., as by immersing it in a water bath of that temperature. It will have been predetermined that, when the above conditions prevail, the thermostat tab 87 will lie in such relationship to the side walls of jacket-slot 88 that it is susceptible of the following operation. Yoke 91 is bodily rotated to shift tab 87 horizontally and thereby, through coil 84, to impose torque on rod 85 sufficient to swing crank 122 in a clockwise direction (Fig. 7) through such an angle that, through connecting rod 123 and crank 121, arm 48 and annulus 46 are moved to a position of equilibrium; that is, midway between the full and dotted line positions of Fig.1. Screws 95 are then tightened and, as a precaution, solder 143 may be applied to the screw and leg 90 to prevent the thermostat from subsequently getting out of adjustment.

If, now, the water bath be lowered in temperature, coil 84 reacts in a manner to rotate rod 85 clockwise (Fig. 7) swinging crank 122 clockwise and, through link 123, swinging arm 48 counterclockwise, thus raising annulus 46 to the full line position of Fig. 1. The operating differential necessary to accomplish this movement is very slight, say about 1° F.

Now, assume that, with the regulator still set at 32° F., the temperature of the water bath rises above 32° F. by an amount equal to the operating differential. Thermostat coil 84 will respond in a manner to rotate rod 85 in a counterclockwise direction (Fig. 7) thus, through crank arm 122 and connecting rod 123, rotating arm 48 in a clockwise direction (Fig. 1) and depressing annulus 46 to the "snuffing" position indicated by dotted lines in Fig. 1.

If the temperature of the water bath is allowed to continue to rise, with the setting still at 32° F., arm 48, having reached its limit of clockwise rotation, acts through crank 121, link 123 and crank arm 122 to prevent further counterclockwise rotation of rod 85. Accordingly, the thermostat coil, in its effort to seek its positions of equilibrium for the higher and higher temperatures to which it is being progressively exposed, becomes stressed to correspondingly greater degrees.

The stress thus built up in the thermostatic coil 84 can be controllably relieved by allowing the upper end of rod 85 to move bodily through predetermined extents to the left from the position of Fig. 7, or, in the example now under particular consideration, from its initial position as established by the 32° F. condition of the coil. Accordingly, if we wish to determine and mark any particular position of the regulating means which will correspond with some higher temperature at which we choose to have the snuffer rise to equilibrium position, we may proceed as follows.

The water bath is raised to and held at a selected temperature for which we are to set the regulator. The upper end of rod 85 is then manually moved bodily to the left, thus progressively relieving the built-up stress in the spring coil and thus correspondingly lessening the effective pressure which is tending to hold arm 48 from swinging in a counter-clockwise direction. The left-wise movement of the upper end of the rod is continued until arm 48 and annulus 46 are in equilibrium condition, and the setting of the regulator is marked on scale plate 76. If this setting be held and the temperature of the thermostatic coil be lowered by an amount equal to the "operating differential" rod 85 will be rotated about its axis in a clockwise direction (Fig. 7) and thus swing arm 48 in a counterclockwise direction sufficiently to carry annulus 46 to the full line position of snuffing of Fig. 1.

From such procedures, or by calculations based on the known response-characteristics of element 84, scale 77 is arrived at, which, of course, is duplicated on all thermostats having the same characteristics, and may include any appropriate number of individually marked settings between the limits determined upon.

If the snap-over spring 135 be installed after the device has been adjusted and calibrated as above, it will, of course, prevent the arm 48 and annulus 46 from dwelling in equilibrium positions, that is, positions mid-way between the full and dotted line positions of Fig. 1. Since the thermostatic coil 84 must overcome the force of spring 135 in order to actuate the snuffer, the value of the "operating differential" will be slightly increased. On the other hand, the snap-over action has the advantage of preventing the arm 48 from hovering in equilibrium condition and thus from being susceptible to extraneous forces which might otherwise cause undesirable snuffer-movement.

It will be seen that regulation of the thermostatic control may be considered broadly as being accomplished by translation of the upper end of rod 85 while the distal end of crank 122 is restrained from movement in the same direction. In the illustrated case, this translation is in a direction generally parallel to the plane of movement of crank arm 121, but this is not to be considered as limitative on the invention.

However, it will be seen that it is not necessary that the translation be exactly parallel to the plane of crank-movement, for it suffices if the direction of movement of the upper end of the rod has a sufficiently large component parallel to that plane to give the desired regulation range; and the fact that the direction of movement may have other components does not necessarily interfere with the operation of the device. We have taken advantage of this fact in developing the exceedingly simple and sure regulation means which is here illustrated and the elements of which have been described.

Assuming the device is in the condition of Fig. 6, if regulating handle 107 be rotated in a clockwise direction, as viewed in Fig. 2, disk 99 is, of course, rotated in the same direction, causing the eccentric boss 98 to follow the arcuate path 144 (Fig. 7) carrying the upper end of rod 85 with it, the link connection 123 holding the distal end of crank 122 against appreciable bodily movement while this is occurring. As is apparent, the direction of movement represented by arc 144 has a sufficiently extensive component of movement parallel to the plane of the direction of movement of crank arm 121, to permit an appreciable range of regulation. It will be seen that it is unnecessary to provide slideways or close-fitting guiding elements usual to translation-control mechanism, thus avoiding the expense and the installation and operating difficulties of such usual mechanisms.

Crank 122 is, of course, very close to the upper end of the relatively long rod 85, and the lower end of the rod, where it is supported by coil 84, may be left free to have the slight bodily movement incident to translation of the upper end of the rod during regulation operations. However, the side arms of stirrup 92 and flanges 93 protect said lower end and prevent accidental excessive bodily displacement thereof.

If pointer 110 be swung to the "off" position on the scale 77 (Fig. 2) the upper end of rod 85 is moved to the position shown in Fig. 7, where lug 125 on crank 122 engages stop lug 120 on arm 48, holding that arm so snuffer 46 is held depressed in its lowest position. Then, no matter how low the temperature may drop, clockwise rotation of rod 85 and crank 122 is prevented by the engagement of lug 125 with stop 120 and the coil 84 is thus ineffective to elevate the snuffer.

In Figs. 11 through 15, there is shown a variational embodiment wherein the burner unit is in the form of an annulus and the thermostatic control unit is, in effect, nested within the annulus bore. The units differ in certain particularities from those previously described but are, in principle, alike in other regards.

The dome and the bottom wall of tank or reservoir 14a are indicated at 12a and 13a, respectively, the dome having a central, downturned neck 25a and the bottom wall having a central upturned neck 160 which has a horizontal shoulder portion 161. A relatively short housing sleeve 24a is extended through and welded to neck 25a, the sleeve projecting somewhat above the top of dome 12a. The lower end of an inner housing tube 162, annularly spaced from tube 24a, is welded to bottom-neck 160, while its upper end is about flush with the top of dome 12a.

Adapted to be removably inserted in tank 14a through the annular space between housing tubes, is an annular, cartridge-form burner assembly or unit 23a. The cartridge includes inner and outer tubular walls 163 and 164', respectively, spaced radially apart to receive between them the main burner wick 29a. The top face 164 of the annular body of wicking is substantially flush with the tops of walls 163 and 164'. Outer wall 164' is apertured at least in that portion which extends below tube 24a, so the wick is exposed to the fuel within tank 14a. External flange 165 on cartridge wall 164' engages the upper end of housing tube 24a to establish the limit to which the cartridge may be thrust into the tank. The lower end of the wicking space is bridged by apertured end wall 166.

A ring 170 is welded within the upper end of cartridge-wall 163, being bent inwardly to form a flange 171 fitting within housing tube 162, and then being bent horizontally to form an internal annular shoulder 172.

Thrust into the upper end of main wick 29a is pilot burner 173 made up of a tubular wire screen 155a whose upper end 156a projects well above main wick 29a. Screen 155a is filled with wicking 28a to a point a short distance above surface 164 of the main wick. The pilot wick is, in effect, a part of the main wick, fuel being supplied to it via the main wick.

The thermostatic control unit B is bodily movable into and out of operative association with the burner assembly. The housing structure whereby this is accomplishable will first be described, without regard to the contained mechanism, it merely being noted at this point that when that housing structure is releasably clamped in assembly with the other heater units, all parts of the burner and control units are releasably held in register with one another in the positions of Fig. 11.

Sleeve 68a has an external collar 174 at its upper end which fits within the bore of ring-flange 171 and is seated on annular shoulder 172. Welded to the lower end of sleeve 68a is an end plate 175 which is apertured at 176. After the sleeve 68a is lowered to position, lock-disk 177 is applied across the bore of the lower neck 160, with the disk-flange 178 in engagement with shoulder 161, and screws 179 are extended through disk 177 and threaded into end plate 175. The screws draw sleeve 68a downwardly to tightly engage collar 174 with shoulder 172. This action, in turn, draws burner-cartridge flange 165 into tight engagement with the top of tube 24a, it following that screws 179 act to tightly clamp both the burner unit and the control unit against axial or rotational displacement.

Locking disk 177 is apertured at 179', so air surrounding the heater and entering base-chamber 20a through openings 21a, may pass through plate openings 176 into the bore 180 of jacket 68a, within which bore the thermostatic element 84a is disposed. Element 84a is a bi-metallic member of the resilient, open coil type, the lower end thereof being fixed at 181 to rod 85a. Rod 85a is mounted for rotation in end plate 175 and bridge 182, cotter key 183 holding the rod against displacement upwardly through jacket 68a. Bridge 182 is rigidly held in spaced, vertical relation with sleeve 68a by post straps 184.

Secured to the upper face of bridge 182 is a bracket arm 185 which supports at its lower end a scale-plate 186, carrying an arcuate flange 187 centered on rod 85a and provided with notches 188. The scale-plate preferably rests on dome 12a when unit B is assembled with the heater, and the notches are scaled with temperature indicia, as at 189.

Applied to the upper end of rod 85a and adjustably fixed against rotation with respect thereto at 217, is a regulating handle 107a which has sufficient vertical resilience to tend to press its neck 190 into any notch 188 with which it may register. On the other hand, extension 190 may be sprung upwardly to clear the neck from a given notch, and the handle 107a then swung horizontally to rotate rod 85a to a position where the neck will register with some other selected notch. Of course, when the neck rests in any one of the notches, the rod 85a and the lower end of coil 84a are held against rotation.

The upper end of coil 84a is secured at 192 to anchor ring 193 which is operatively associated with the torque-transmitting unit indicated at 194, rod 85a being taken, with clearance, in the bore 195 of the ring (Fig. 15). The torque-transmitting unit also includes rods 196 which are extended, with slidable clearance, through the diametrically opposite holes 197 provided in ring 193. Rods 196 extend through and are welded to vertically spaced disks 198. The disks are centrally apertured at 199 to take rod 85a with working clearance, and they serve not only as rod-connectors, but also as radiation shields. The upper ends of rods 196 are bent outwardly to form torque arms 209, said arms extending oppositely and radially with respect to rod 85a.

It will be seen that torque-transmitting unit 194, and rod 85a are relatively angularly and axially movable; that unit 194 and ring 193 (and the attached coil 84a) are relatively vertically movable; but that unit 194 is fixed against rotation with respect to ring 193. Consequently, torque applied to ring 193 by rotation of rod 85a or by the reaction of bi-metallic coil 84a to temperature changes, tends to rotate unit 194 about the axis of rod 85a and thus carry torque arms 200 bodily through circumferential paths. The axial expansion and contraction of coil 84a does not interefer with this movement, due to the capacity for relative vertical movement between ring 193 and rods 196.

The snuffer or extinguisher (also functioning at times as a re-lighter) is generally indicated at 201 and, in effect, is a split annulus made up of two semi-circulr segments 202 and 203, the annulus being of such dimensions that, when in assembly with the thermostatic control and the burner unit, it fits over the upper end of main wick 29a except at 204 where the opposed edges of segments or leaves 202, 203 are cut away to provide a slot for the reception of pilot 173. The annulus 201 has external and internal flanges 204' and 205 which incline downwardly and oppositely outwardly, giving each segment cupshaped, transverse cross section. Flanges 204' and 205 are adapted to engage the upper ends of cartridge walls 163 and 164' when the main burner is "off."

The individual fabrication, mounting and operation of the segments 202 and 203 are the same, and therefore the detailed description may be limited to but one of them, though corresponding parts of the two segments are given the same reference numerals so the description will commonly apply. Welded to each snuffer is a flat arm 206 which, in effect, projects into the annulus bore at one side of rod 85a. The arm is mounted for pivotal movement at 207 about a horizontal axis represented by pivot pin 208 which is in a vertical axial plane of pilot 173 and lies just over the opposed ends of annulus segments 202 and 203 at the side opposite the pilot. Pin 208, in turn, is supported in bridge-posts 184, being held against axial dislodgement by having one of its ends 209 turned down into arm-socket 210 (Fig. 11). The distal end 211 of arm 206 is provided, at its under side, with a counter-balance 212.

At the opposite side of rod 85a, segment 203 carries a short arm 213, parallel to arm 206, which is pivotally connected at 214 to the pin 208 lying at said opposite side of the rod. Depending from each arm 206 is a crank ear 215 which is apertured to take the arm 200 of one of the torque rods 196. When the annulus 201 is in the "off" position of Fig. 11 (corresponding to the full-line position of Fig. 14) the point of pivotal connection 216 between a given ear 215 and its associated rod-arm 200 lies in vertical alignment with the associated pivot pin 208.

It will be seen that if torque assembly 194 be rotated in a counterclockwise direction, from the aspect of Fig. 13, the crank ear 215 associated with segments 203 will be swung in a clockwise direction, as viewed in Fig. 14, thus swinging the segment, itself, towards, to, or beyond the dotted line position of Fig. 14, thus exposing one half of the upper end of main wick 29a so it may automatically be ignited from pilot 173. The same movement of the torque assembly 194 causes coincident and equal counterclockwise rotation of segment 202, thus simultaneously exposing the other half of the main wick 29a to the pilot flame. The previously described capacity for relative vertical movement between rods 196 and torque ring 193, permits the vertical displacement of rods 196 due to the vertical component of the swinging movement of crank ears 215.

With thermostatic coil 84a in eqilibrium, all parts of the assembly are in the full line positions of Figs. 11 to 15. If, now, coil 84a is exposed to a rising temperature, its reaction imposes a torque on ring 193 and assembly 194 tending to swing crank ears 215 in directions which more tightly seat the snuffer segments on the upper end of cartridge 23a. On the other hand, if the coil is exposed to a lowering temperature, its reaction through the torque mechanism tends to swing the segments 202, 203 in directions uncovering the main wick 29a and thus allowing it to be automatically lighted from the constantly burning pilot.

It will be obvious that, with the upper end of coil 84a held against rotation, rotation of rod 85a by handle 107a imposes on coil 84a a regulatory stress. Scale 189 is so calibrated that any given setting of the regulating handle with respect to that scale, establishes a pre-stressing of the coil such, that when the coil is subsequently exposed to the indicated temperature, said coil will be substantially in equilibrium and therefore all elements will be in the positions of Fig. 11. If the temperature drops below the indicated temperature, the coil, in seeking to reach its position of equilibrium for the new temperature, acts through torque assembly 194 to elevate the snuffer segments and thus cause the automatic lighting of the main burner. Then, as the temperature rises and finally reaches the indicated degree, the coil 84a is restored to its original condition of equilibrium and the snuffer 201 is returned to the position of Fig. 11, thus snuffing the main burner flame, but not, of course, interfering with the pilot flame.

While we have shown and described preferred embodiments of our invention, various changes in design, structure and arrangement may be made without departing from the spirit and scope of the appended claims.

We claim:

1. A thermostatic control unit comprising a tubular housing, a bi-metallic coil member axially centered within and held against bodily movement with respect to the housing, a rotatable rod member within the housing and fixed to one end of the coil member, a control element mounted, independently of the rod, on the housing for pivotal movement about an axis which is transverse with respect to the rod axis, a crank on the control element, a positive push-pull connection between one of said members and said crank, all in a manner whereby temperature-responsive movement of the coil actuates said crank to move the control element pivotally in one direction or the other; manually operated means applied to the rod for moving it in a manner regulating the effective stress in the coil member, and latch means releasably holding said manually operated means in selected positions of adjustment.

2. A thermostatic control unit comprising a housing, a bi-metallic coil, means fixing one end of the coil against movement with respect to the housing, a rod secured at one point to and supported by the other end of the coil, means on the housing rotatably supporting said rod at a point axially spaced from said one point, a control member movably supported on the housing, and an operative connection between the rod and control member whereby temperature-responsive movement of the coil moves the control member; said means for rotatably supporting the rod comprising a member rotatably supported by the housing for rotation about an axis substantially in line with the axis of the coil, said rod engaging the supporting member at a point eccentric with relation to the axis of rotation of said supporting member.

3. A thermostatic control unit comprising a housing, a bi-metallic coil, means fixing one end of the coil against movement with respect to the housing, a rod secured at one point to and supported by the other end of the coil, means on the housing rotatably supporting said rod at a point axially spaced from said one point, a control member pivotally supported on said housing, a crank on said rod, a crank on said control member, and a link connection between the cranks; said means for rotatably supporting the rod being shiftable in a direction having an appreciable component parallel to the plane of movement of the second mentioned crank, and means for so shifting said last named means.

4. A thermostatic control unit comprising a housing, a bi-metallic coil, means fixing one end of the coil against movement with respect to the housing, a rod secured at one point to and supported by the other end of the coil, means on the housing rotatably supporting said rod at a point axially spaced from said one point, a control member pivotally supported on said housing, a crank on said rod, a crank on said control member, a link connection between the cranks, and means for translating the said rod, at its housing-supported point, in a given direction while the distal end of the rod crank is restrained against movement in that direction.

5. A thermostatic control unit comprising a housing, a bi-metallic coil, means fixing one end of the coil against movement with respect to the housing, a rod secured at one point to and supported by the other end of the coil, means on the housing rotatably supporting said rod at a point axially spaced from said one point, a control member pivotally supported on said housing, a crank on said rod and located between said points, a crank on said control member, a link connection between the cranks, and means for translating the said rod, at its housing-supported point, in a given direction while the distal end of the rod crank is restrained against movement in that direction.

6. A thermostatic control unit comprising a housing, a bi-metallic coil, means fixing one end of the coil against movement with respect to the housing, a rod secured at one point to and supported by the other end of the coil, means on the housing rotatably supporting said rod at a point axially spaced from said one point, a control member pivotally supported on said housing, a crank on said rod, a crank on said control member, a link connection between the cranks, means for translating said rod, at its housing-supported point, in a given direction while the distal end of the rod crank is restrained against movement in that direction, and means for releasably holding said rod, at its housing-supported point, in selected positions of translation.

7. A thermostatic control unit comprising a housing, a bi-metallic coil, means fixing one end of the coil against movement with respect to the housing, a rod secured at one point to and supported by the other end of the coil, means on the housing rotatably supporting said rod at a point axially spaced from said one point, a control member pivotally supported on said housing, a crank on said rod, a crank on said control member, and a link connection between the cranks; and means on said rod and member adapted to coact, when the rod is rotated to a given position, in a manner whereby the member is held against pivotal movement in one direction, at least.

8. A thermostatic control unit comprising a housing, a bi-metallic coil, means fixing one end of the coil against movement with respect to the housing, a rod secured at one point to and supported by the other end of the coil, means on the housing rotatably supporting said rod at a point axially spaced from said one point, a control member pivotally supported on said housing, a crank on said rod, a crank on said control member, and a link connection between the cranks, a lug on the first mentioned crank and a lug on said member, said lugs being adapted to coact, when the rod is rotated to a given position, in a manner whereby the member is held against pivotal movement in one direction, at least.

9. In a thermostatic control unit, a housing, a bi-metallic coil, means fixing one end of the coil against movement with respect to the housing, a rod secured at one point to and supported by the other end of the coil, means on the housing rotatably supporting said rod at a point axially spaced from said one point, said last named means being movable transversely with respect to the axis of the housing, and means for so moving said last named means and thereby translating the rod, at its housing supported point, with relation to the housing-fixed end of the coil.

10. The combination of claim 9; wherein the means rotatably supporting the rod embodies a member rotatably mounted on the housing, and a rod-taking element on said member, said element being located eccentrically with relation to the axis of rotation of said member.

11. A thermostatic control unit comprising a housing, a bi-metallic coil within the housing, a rod rotatably mounted in the housing and extending axially through the bore of the coil and fixed at one end to said coil, adjustable means for holding the rod in a selected one of a plurality of positions against rotation with respect to the housing, a control member pivotally connected to the housing, a crank arm on said control member, a torque-transmitting assembly applied to the other end of the coil, and a positive push-pull connection between the torque transmitting assembly and said crank arm whereby rotation of said assembly under temperature-responsive movement of the coil actuates said crank arm to move the control member pivotally in one direction or the other; said torque transmitting assembly including a member extending substantially axially parallel to the rod, said last named member and said coil being relatively axially movable but held against relative rotation, and a crank arm on said last named member and operatively connected to the first mentioned crank arm.

12. A unit as in claim 11, wherein the respective planes of rotation of said crank arms are normal with respect to each other.

References Cited in the file of this patent

UNITED STATES PATENTS

| | | |
|---|---|---|
| 1,157,255 | Quinn | Oct. 19, 1915 |
| 1,169,071 | Essig | Jan. 18, 1916 |
| 1,920,284 | Wells | Aug. 1, 1933 |
| 2,220,630 | Trethewey | Nov. 5, 1940 |
| 2,224,210 | Anderson | Dec. 10, 1940 |
| 2,227,689 | Agricola | Jan. 7, 1941 |
| 2,236,032 | Helgeson | Mar. 25, 1941 |
| 2,276,872 | Quinn | Mar. 17, 1942 |
| 2,312,479 | Ray | Mar. 2, 1943 |
| 2,479,392 | Miller | Apr. 16, 1949 |
| 2,602,593 | Raney | July 8, 1952 |